(12) United States Patent
Sun

(10) Patent No.: US 7,707,576 B2
(45) Date of Patent: Apr. 27, 2010

(54) METHOD OF AND APPARATUS FOR MANAGING TASK, AND COMPUTER PRODUCT

(75) Inventor: Zhitai Sun, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1288 days.

(21) Appl. No.: 10/852,333

(22) Filed: May 24, 2004

(65) Prior Publication Data

US 2005/0183085 A1 Aug. 18, 2005

(30) Foreign Application Priority Data

Feb. 17, 2004 (JP) ............................. 2004-039807

(51) Int. Cl.
*G06F 9/46* (2006.01)
(52) U.S. Cl. .................. 718/102; 718/101; 718/103
(58) Field of Classification Search ......... 718/101–103, 718/106
See application file for complete search history.

(56) References Cited

U.S. PATENT DOCUMENTS

| 5,928,322 | A * | 7/1999 | Bitar et al. .................. 718/103 |
| 6,732,138 | B1 * | 5/2004 | Browning et al. ........... 718/102 |
| 7,165,134 | B1 * | 1/2007 | Kardach ..................... 710/264 |
| 2004/0098722 | A1 * | 5/2004 | Funaki et al. ................ 718/103 |
| 2005/0039181 | A1 | 2/2005 | Togawa |
| 2005/0149933 | A1 * | 7/2005 | Saito et al. .................. 718/100 |

FOREIGN PATENT DOCUMENTS

| JP | A 59-136853 | 8/1984 |
| JP | A 61-220036 | 9/1986 |
| JP | A 1-246636 | 10/1989 |
| JP | 05-020102 | 1/1993 |
| JP | A 5-108380 | 4/1993 |
| JP | A5-197577 | 8/1993 |
| JP | A 8-77025 | 3/1996 |
| JP | 2000-242512 | 9/2000 |
| JP | A 2003-345612 | 12/2003 |

OTHER PUBLICATIONS

Lui Sha, et al., "Priority Inheritance Protocols: An Approach to Real-Time Synchronization." IEEE Transactions on Computers, vol. 39, No. 9, pp. 1175-1185.
Paul N. Leroux; "Real Time or Real Linux", Aug. 8, 2003; pp. 1-9; website: http://www.qnx.co.jp/resource/.

* cited by examiner

*Primary Examiner*—Thomas Lee
*Assistant Examiner*—Camquy Truong
(74) *Attorney, Agent, or Firm*—Greer, Burns & Crain, Ltd.

(57) ABSTRACT

A task management method includes determining, when a task other than an operating system task operated cooperatively with a process executed under a control of an operating system requests a cooperative operation to the operating system task and is set in a wait state, whether a priority of the task is higher than a priority of other task set in a wait state by requesting a cooperative operation to the operating system task, and making, when the priority of the task is determined to be higher than the priority of the other task, the operating system task and a process under control of the operating system operated cooperatively with the task succeed the priority of the task.

5 Claims, 6 Drawing Sheets

METHOD OF AND APPARATUS FOR MANAGING TASK, AND COMPUTER PRODUCT

BACKGROUND OF THE INVENTION

1) Field of the Invention

The present invention relates to a technology for managing tasks on a computer having a dual operating system by setting an appropriate priority for each of the tasks.

2) Description of the Related Art

Recently, a hybrid operating system (OS) in which two OS's are running on a single computer became popular. Since some OS is excellent in real-time processing while other is superior in development environment, it is possible to make use of different merits by employing a plurality of OS's.

As an example of the hybrid OS is shown in FIG. 6. In this system, a general purpose OS (GPOS) is placed on a real time OS (RTOS) and the GPOS is executed as one task of the RTOS. In other words, the GPOS and processes executed under the control of the GPOS are executed as a GP task. One example of such GPOS is Linux.

In such type of hybrid OS, since the GPOS and a process under the control of the GPOS do not strongly require real-time properties, the GP task is executed with the lowest priority, and other RT tasks are executed by priority.

However, in an in-vehicle navigation system, for example, when a route searching task serving as an RT task is executed with a higher priority than a user interface process under the control of a GPOS, a user operation may not be recognized. Therefore, it is not always preferable that the GP task is executed with the lowest priority (see, for example, Japanese Patent Application Laid-Open Publication No. 2000-242512).

Besides, in the hybrid OS, a process under the control of a GPOS and another RT task may have to be cooperatively operated. For example, in a streaming play of music through the Internet, it is necessary to receive music data from the Internet by a process under the control of the GPOS, and to transmit the music data received to a music reproducing RT task.

In such a case, when the GP task has a low priority, the GP task and a real-time task having a high priority cannot be cooperatively operated. Thus, as in a case in which the two tasks communicate with each other under a single OS, the GP task may succeed the high priority from the RT task.

However, when the GP task simply successes the high priority of the RT task, other processes except for the process cooperatively operated with the RT task are also executed with a high priority, and as a result, the execution of the RT task is interfered.

SUMMARY OF THE INVENTION

It is an object of the present invention to solve at least the problems in the conventional technology.

The computer program according to one aspect of the present invention makes a computer execute determining, when a task other than an operating system task operated cooperatively with a process executed under a control of an operating system requests a cooperative operation to the operating system task and is set in a wait state, whether a priority of the task is higher than a priority of other task set in a wait state by requesting a cooperative operation to the operating system task; and making, when the priority of the task is determined to be higher than the priority of the other task, the operating system task and a process under control of the operating system operated cooperatively with the task succeed the priority of the task.

The task management apparatus according to another aspect of the present invention includes a priority determining unit that determines, when a task other than an operating system task operated cooperatively with a process executed under a control of an operating system requests a cooperative operation to the operating system task and is set in a wait state, whether a priority of the task is higher than a priority of other task set in a wait state by requesting a cooperative operation to the operating system task; and a priority succession unit that makes, when the priority of the task is determined to be higher than the priority of the other task, the operating system task and a process under control of the operating system operated cooperatively with the task succeed the priority of the task.

The task management method according to still another aspect of the present invention includes determining, when a task other than an operating system task operated cooperatively with a process executed under a control of an operating system requests a cooperative operation to the operating system task and is set in a wait state, whether a priority of the task is higher than a priority of other task set in a wait state by requesting a cooperative operation to the operating system task; and making, when the priority of the task is determined to be higher than the priority of the other task, the operating system task and a process under control of the operating system operated cooperatively with the task succeed the priority of the task.

The computer readable recording medium according to still another aspect of the present invention stores the computer program according to the above aspect.

The other objects, features, and advantages of the present invention are specifically set forth in or will become apparent from the following detailed description of the invention when read in conjunction with the accompanying drawings.

DETAILED DESCRIPTION

Exemplary embodiments of a method of and an apparatus for managing task, and a computer product according to the present invention are described in detail below with reference to the accompanying drawings.

Figure 1:
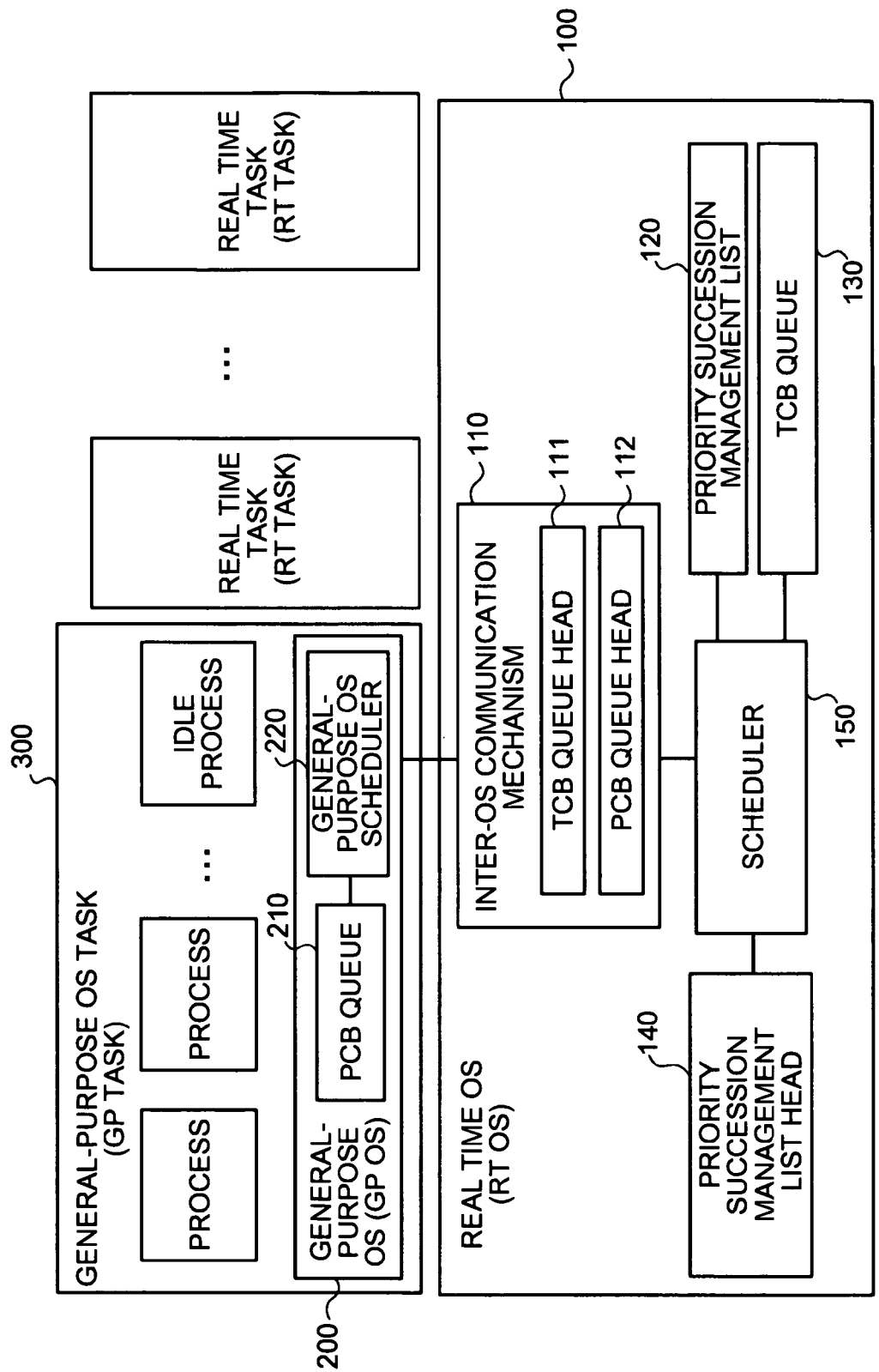
FIG. 1 is a block diagram of a hybrid OS according to an embodiment of the present invention.

FIG. 1 is a block diagram of a hybrid OS according to an embodiment of the present invention. This hybrid OS includes a RTOS 100, and a GPOS 200.

The RTOS 100 is an OS that executes the GPOS 200 and a process executed under the GPOS 200 as one of real time tasks (hereinafter, "RT tasks"), and has an inter-OS communication mechanism 110, a priority succession management list 120, a TCB queue 130, a priority succession management list head 140, and a scheduler 150. The GPOS 200 is executed as a general-purpose OS task (hereinafter, "GP task") 300 under the control of the RTOS 100 together with processes controlled by the GPOS 200.

The inter-OS communication mechanism 110 is an object that provides a communication function between the RTOS 100 and the GPOS 200, and is constituted by a data structure such as a first-in-first-out (FIFO) or a message box and a method.

The inter-OS communication mechanisms 110 are generated for combinations of RT tasks to be communicated and processes. Data structures such as FIFOs and message boxes are generated depending on communication schemes. The combination of the RT task to be communicated and the process may include a plurality of tasks and a plurality of processes.

Each of the inter-OS communication mechanisms 110 has a TCB queue head 111 and a PCB queue head 112. The TCB queue head 111 is a pointer that indicates the head of the TCB queue 130, and the PCB queue head 112 is a point that indicates the head of the PCB queue 210. The details of the TCB queue 130 and the PCB queue 210 will be described later.

The priority succession management list 120 is a list in which task control blocks (TCBs) set in a wait state when inter-OS communication is requested are connected in a preferential order.

The TCB queue 130 is a queue that connects the TCBs of all the RT tasks set in a wait state when inter-OS communication is requested to the inter-OS communication mechanisms 110. As described above, the head of the TCB queue 130 is indicated by the TCB queue head 111 of the inter-OS communication mechanism 110.

The priority succession management list head 140 is a point that indicates the head of the priority succession management list 120. More specifically, the priority succession management list head 140 indicates the TCB of the RT task having the highest priority in the RT tasks set in a wait state when inter-OS communication is requested.

The scheduler 150 is a processing unit that manages execution of the RT tasks on the basis of the priorities stored in the TCBs of the RT tasks. When the RT task communicates with a process controlled by the GPOS 200, the scheduler 150 causes only a process communicating with the RT task to succeed the priority of the RT task.

More specifically, when a communication request is transmitted from the RT task to the GP task 300 to set the RT task in a wait state, and when the RT task is connected to the head of the priority succession management list 120, i.e., when the RT task has the highest priority in RT tasks set in a wait state when inter-OS communication is requested the scheduler 150, the priority is succeeded by a GP task 300. The scheduler 150 causes a process communicating with the RT task set in a wait state to succeed the priority.

When the execution of the wait task is resumed by ending the inter-OS communication between the RT task and the GP task 300, and when the priority succession management list 120 is not empty, i.e., when there is an RT task set in a wait state by requesting inter-OS communication, the scheduler 150 causes a process communicating with the RT task and the GP task 300 to succeed the priority of the highest-priority RT task of the RT tasks set in a wait state. When the priority succession management list 120 is empty, i.e., when there are no other RT tasks set in a wait state by requesting inter-OS communication, the priority of the GP task 300 is returned to the original low priority.

In this manner, the scheduler 150 causes only the process communicating with the RT task to succeed the priority of the RT task and does not cause other processes under the control of the GPOS 200 to succeed the priority of the RT task. Thus, the processes other than the process communicating with the RT task can be prevented from being executed at a high priority.

The GPOS 200 parallel processes a plurality of processes as an OS, and is constituted as a lowest-priority RT task executed under the control of the RTOS 100. There is an idle process controlled by the GPOS 200. The idle process is always set in an excusable state.

The GPOS 200 has a PCB (Process Control Block) queue 210 and a GPOS scheduler 220. The PCB queue 210 is a queue that connects a PCB of a process communicating with another RT task by using the inter-OS communication mechanism 110 in each of the inter-OS communication mechanisms 110. As described above, the head of the PCB queue 210 is indicated by the PCB queue head 112 of the inter-OS communication mechanism 110.

The scheduler 150 of the RTOS 100 accesses the PCB queue 210 through the inter-OS communication mechanism 110, or the scheduler 150 gives designation to the GPOS scheduler 220 to make it possible to specify a process communicating with the RT task, i.e., a process that is caused to succeed the priority of the RT task.

The GPOS scheduler 220 is a processing unit that manages execution of a process executed under the control of the GPOS 200 on the basis of the priority in the PCB. The GPOS scheduler 220 changes the priority of the process communicating with the RT task according to the designation from the scheduler 150.

Figure 2:
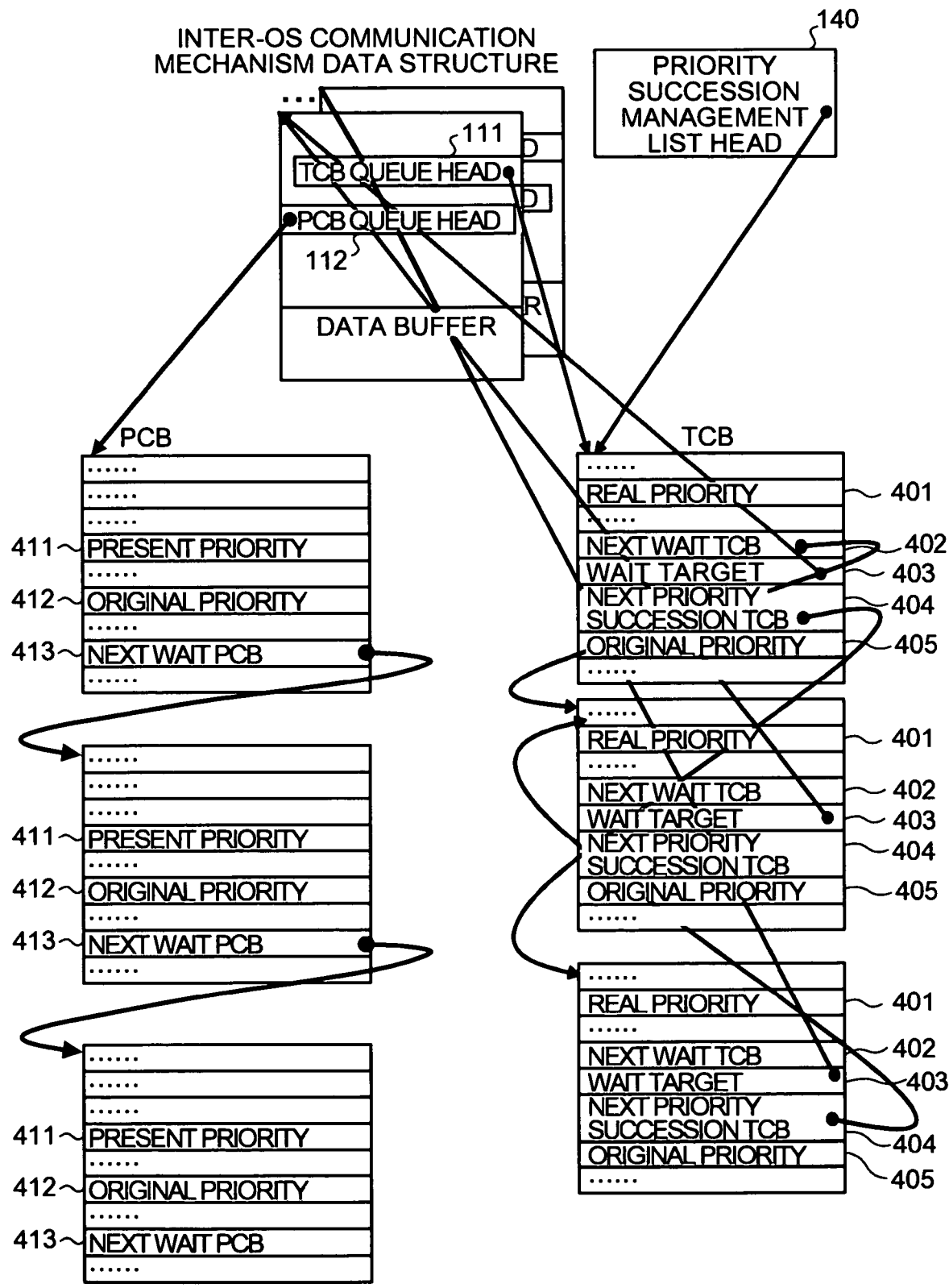
FIG. 2 is a schematic for explaining a data structure used by an RTOS according to the embodiment in priority succession to a process controlled by a GPOS.

FIG. 2 is a schematic for explaining a data structure used by an RTOS 100 according to the embodiment in priority succession to a process controlled by a GPOS 200. The head of the priority succession management list 120 in which the TCBs of all RT tasks set in a wait state by requesting inter-OS communication are connected in a preferential order of the RT tasks is indicated by the priority succession management list head 140. The head of the TCB queue 130 that connects the TCBs of all the tasks by requesting inter-OS communication from the inter-OS communication mechanism 110 for each inter-OS communication mechanisms 110 is indicated by the TCB queue head 111. The head of the PCB queue 210 that connects the PCB of a process communicating with the RT task by using the inter-OS communication mechanism 110 for each inter-OS communication mechanism 110 is indicated by the PCB queue head 112.

Each TCB includes a actual priority 401 which is a priority used when an RT task corresponding to the TCB is executed, a next wait TCB 402 which is a pointer for the TCB queue 130, a wait target 403 which is a pointer to the inter-OS communication mechanism 110 used by the RT task in inter-OS communication, a next priority succession TCB 404 which is a pointer for the priority succession management list 120, and a original priority 405 which is an original priority of the RT task.

Each PCB includes a present priority 411 serving as a priority succeeded from the RT task, an original priority 412 serving as an original priority of a process corresponding to the PCB, and a next wait PCB 413 serving as a pointer for the PCB queue 210.

The scheduler 150 specifies a priority succession management head TCB indicated by the priority succession management list 120 and uses the wait target 403 stored in the TCB to specify the inter-OS communication mechanism 110 used by an RT task. The scheduler 150 uses the PCB queue head 112 held by the specified inter-OS communication mechanism 110 to specify a process to succeed the priority.

In this manner, the scheduler 150 specifies the TCB of the highest-priority RT task of the tasks set in a wait state by requesting inter-OS communication by using the priority succession management list 120. The scheduler 150 specifies the inter-OS communication mechanism 110 used by the RT task by using the specified wait target 403. The scheduler 150 specifies a process to succeed priority by using the PCB queue head 112 held by the specified inter-OS communication mechanism 110, so that the priority of the RT task can be succeeded by the process communicating with the RT task.

Figure 3:
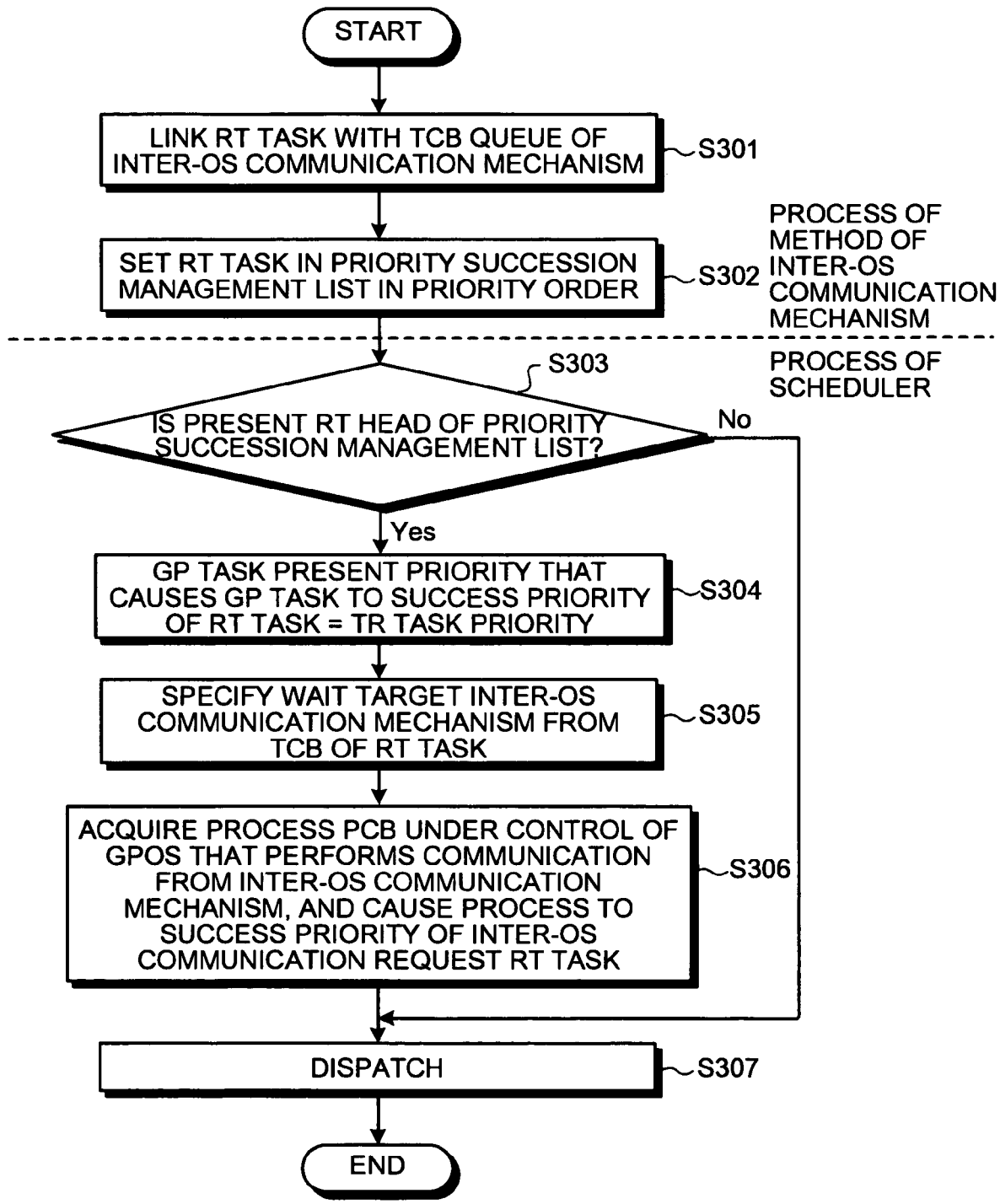
FIG. 3 is a flowchart of a process procedure of the RTOS when a communication request is transmitted from an RT task to a GP task to set the RT task in a wait state.

FIG. 3 is a flowchart of a process procedure of the RTOS 100 when a communication request is transmitted from an RT task to a GP task 300 to set the RT task in a wait state. When a communication request is transmitted from the RT task to the GP task 300 to set the RT task in a wait state, the method of the inter-OS communication mechanism 110 which processes the communication request links the tasks to be set in a wait state to the TCB queue 130 (step S301). At the same time, the tasks are described in the priority succession management list 120 in the preferential order (step S302).

The scheduler 150 checks whether the present RT task is the RT task at the head of the priority succession management list 120 or not before dispatch, i.e., whether the present RT task set in a wait state by executing inter-OS communication request has a priority higher than that of another RT task in the priority succession management list 120 or not (step S303).

As a result, when the present RT task is the RT task at the head of the priority succession management list 120, the priority of the process communicating with the RT task is increased to the priority of the RT task.

More specifically, the priority of the RT task is succeeded by the GP task 300 (step S304), and the inter-OS communication mechanism 110 is specified by using the wait target 403 of the TCB of the RT task (step S305). The PCB of the process communicating with the RT task is acquired from the specified inter-OS communication mechanism 110, and the priority of the RT task is succeeded by the PCB (step S306). More specifically, the priority of the RT task is set to be a present priority 411 of the acquired PCB. A dispatch process is started (step S307).

On the other hand, when the present RT task is not the RT task at the head of the priority succession management list 120, the priority of the RT task at the head of the priority succession management list 120 has been succeeded by the GP task 300. Thus, the process directly shift to the dispatch process (step S307).

In this manner, when a communication request is transmitted from the RT task to the GP task 300 to set the RT task in a wait state, the method of the inter-OS communication mechanism 110 sets present RT tasks to be set in a wait state in the priority succession management list 120 in a preferential order, and the scheduler 150 checks whether the present RT task is an RT task at the head of the priority succession management list 120 or not before dispatch. When the present RT task is the RT task at the head, the priority of the RT task is succeeded by a process communicating with the RT task to make it possible to increase the priority of the process communicating with the RT task to the priority of the RT task.

Figure 4:
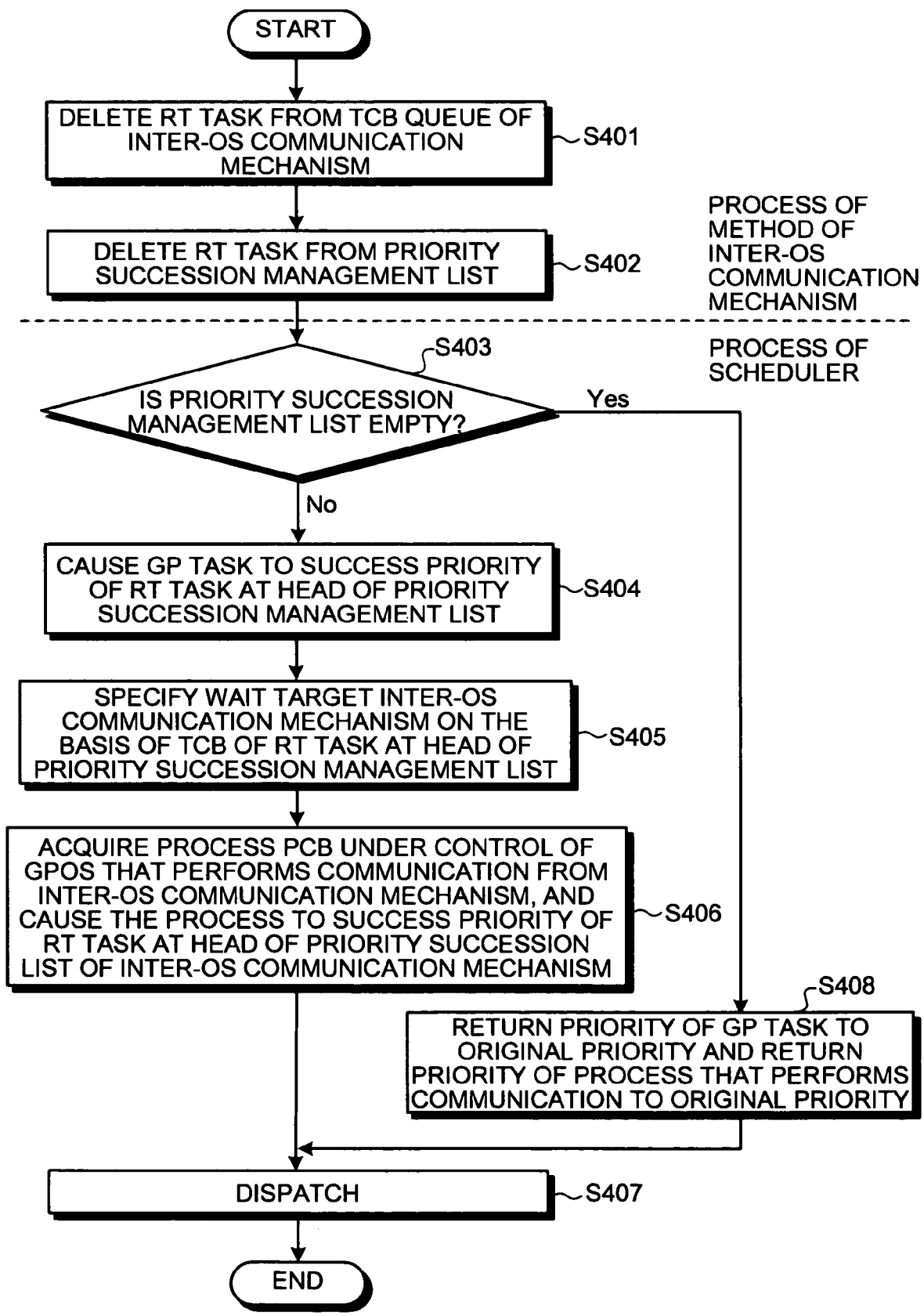
FIG. 4 is a flowchart of a process procedure of the RTOS when execution of an inter-OS communication wait RT task is resumed with end of an inter-OS communication of the GP task.

FIG. 4 is a flowchart of a process procedure of the RTOS 100 when execution of an inter-OS communication wait RT task is resumed with end of an inter-OS communication of the GP task 300. When the execution of the wait task of the RTOS 100 is resumed by ending the inter-OS communication of the GP task 300, the method of the inter-OS communication mechanism 110 which processes communication deletes the RT task the execution of which is resumed from the TCB queue 130 of the inter-OS communication mechanism 110 because the execution of the wait task is resumed (step S401). The RT task is also deleted from the priority succession management list 120 (step S402).

The scheduler 150 checks whether the priority succession management list 120 is empty or not before dispatch (step S403). When the priority succession management list 120 is not empty, the priority of the RT task at the head of the priority succession management list 120 is succeeded by the GP task 300. The priority is succeeded by a process communicating with the RT task.

More specifically, the priority of the RT task is succeeded by the GP task 300 (step S404). The inter-OS communication mechanism 110 is specified by using the wait target 403 of the TCB of the RT task (step S404), and the PCB of a process communicating with the RT task is acquired from the specified inter-OS communication mechanism 110. The priority of the RT task is succeeded by the obtained PCB (step S406). More specifically, the priority of the RT task is set at the present priority 411 of the acquired PCB. A dispatch process is started (step S407).

On the other hand, the priority succession management list 120 is empty, the priority of the GP task 300 and priority of the process which performs communication are returned to original low priorities, respectively (step S408). The process shifts to the dispatch process (step S407).

In this manner, when the execution of the wait task of the RTOS 100 is resumed by ending inter-OS communication of the GP task 300, the method of the inter-OS communication mechanism 110 deletes the RT task the execution of which is resumed from the priority succession management list 120, and the scheduler 150 checks whether the priority succession management list 120 is empty or not before dispatch. When the priority succession management list 120 is not empty, the priority of the RT task at the head of the priority succession management list 120 is succeeded by the process communicating with the RT task, so that the priority of the process communicating with the RT task can be kept at the same level as that of the priority of the RT task with which the process communicates.

Figure 5:
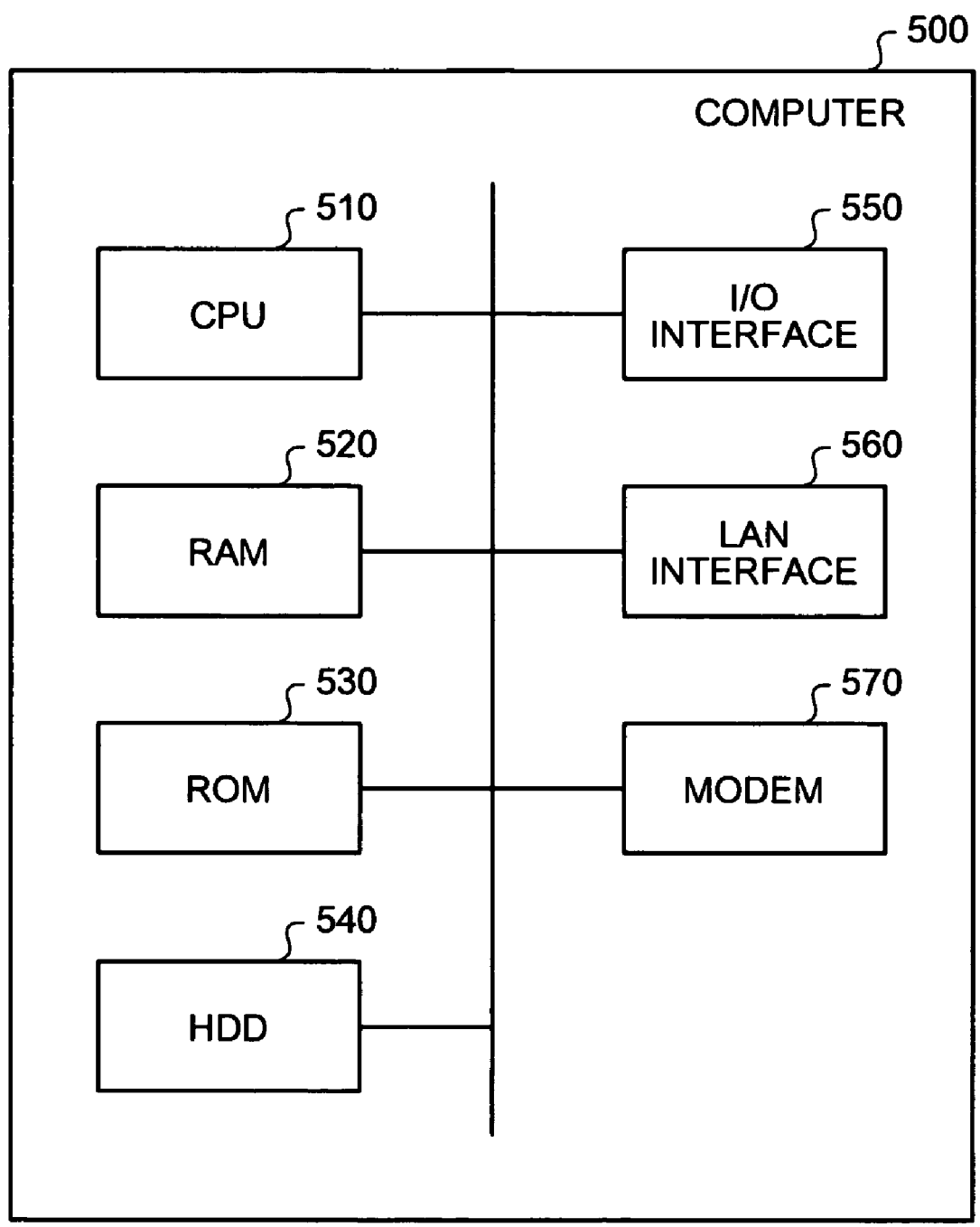
FIG. 5 is a block diagram of a computer that executes the hybrid OS according to the embodiment.
Figure 6:
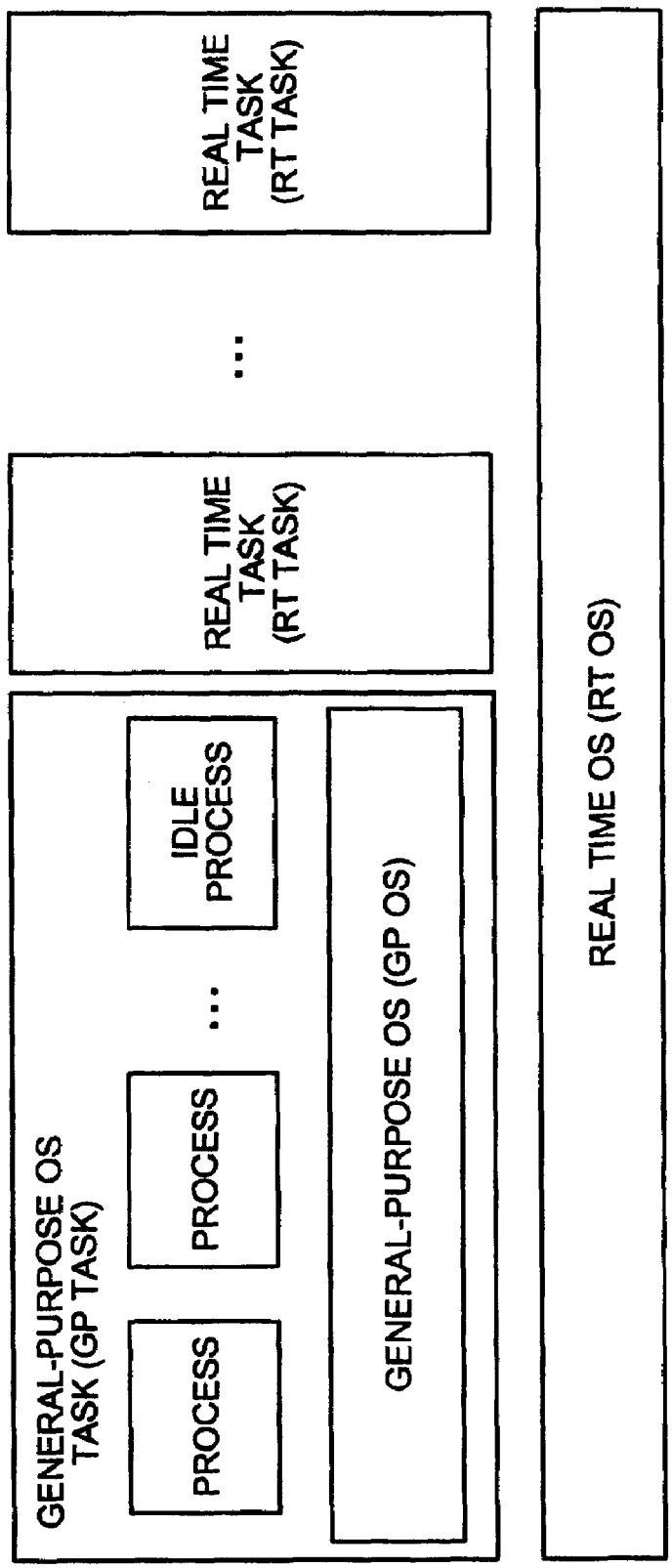
FIG. 6 is a block diagram of a hybrid OS.

FIG. 5 is a block diagram of a computer that executes the hybrid OS according to the embodiment. A computer 500 includes a central processing unit (CPU) 510, a random access memory (RAM) 520, a read only memory (ROM) 530, a hard disk drive (HDD) 540, an input/output (I/O) interface 550, a local area network (LAN) interface 560, and a modem 570.

The CPU 510 is a processor that executes a hybrid OS, an application program, or the like. The RAM 520 is a storage unit that stores the priority succession management list 120, the TCB queue 130, the PCB queue 210, and the like.

The ROM 530 is a storage unit in which constants and the like which are not changed. The HDD 540 is a magnetic disk device that stores a program or a file. The program stored in the HDD 540 is executed by the CPU 510 by using the RAM 520 and the ROM 530.

The I/O interface 550 is an interface that connects input/output devices such as a display device, a keyboard, and a mouse. The LAN interface 560 is an interface that connects the computer to a LAN, and the modem 570 is a device that connects the computer to a public network.

According to the present embodiment, the TCBs of all the RT tasks set in a wait state by requesting inter-OS communication are managed in a preferential order by using the priority succession management list 120. When a communication request is transmitted from the RT task to the GP task 300 to set the RT task in a wait state, the scheduler 150 checks whether the RT task is the RT task at the head of the priority succession management list 120 or not. When the RT task is the RT task at the head, the priority of the RT task is succeeded by only a process communicating with the RT task. Thus, other processes can be prevented from being executed at the priority of the RT task, and execution of the RT task can be prevented from being interrupted by other processes.

According to the present embodiment, when the execution of the wait task of the RTOS 100 is resumed by ending the inter-OS communication of the GP task 300, the scheduler 150 checks whether the priority succession management list 120 is empty or not. When the priority succession management list 120 is not empty, the priority of the RT task at the head of the priority succession management list 120 is set as the priority of the process communicating with the RT task, so that the priority of the process communicating with the RT task can be kept at the same level as that of the priority of the RT task with which the process communicates.

According to the present invention, a process other than a process cooperatively operated with an RT task under the control of a GPOS is prevented from being executed at a high priority. Thus, the RT task can be advantageously prevented from being interrupted by execution of another process at a high priority.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A computer readable recording medium for storing a computer program executed by a computer, the computer having a hybrid operating system including a general purpose operating system (GPOS) and a real time operating system (RTOS), the RTOS executing a process under the GPOS as one of real time tasks (RT tasks) to execute the process with a high priority, the computer executes the GPOS as a general-purpose OS task (GP task), the computer program making a computer execute:

transmitting a request for a communication between the RTOS and the GPOS from an RT task having a priority and included in the RT tasks to the GP task;

setting the RT tasks in a wait state, when the communication between the RTOS and the GPOS is requested;

determining whether the priority of the RT task requesting the communication is the highest in the RT tasks being set in a wait state; and making the GP task succeed to the priority of the RT task requesting the communication and being determined to have the highest priority in the RT tasks being set in the wait state;

resuming execution of the RT tasks being set in the wait state in the setting step, by ending the communication;

determining whether an other RT task having the highest priority is present in the RT tasks being set in the wait state, by requesting a communication between the RTOS and the GPOS, by using a priority succession management list in which task control blocks of all RT tasks being set in the wait state are connected in order of priority; and when presence of the other RT task having the highest priority is determined by specifying a head of the priority succession management list, making the other RT task succeed to priority of the RT task having the highest-priority.

2. A computer readable recording medium for storing a computer program executed by a computer, the computer having a hybrid operating system including a general purpose operating system (GPOS) and a real time operating system (RTOS), the RTOS executing a process under the GPOS as one of real time tasks (RT tasks) to execute the process with a high priority, the computer executes the GPOS as a general-purpose OS task (GP task), the computer program making a computer execute:

transmitting a request for a communication between the RTOS and the GPOS from an RT task having a priority and included in the RT tasks to the GP task;

setting the RT tasks in a wait state, when the communication between the RTOS and the GPOS is requested;

determining whether the priority of the RT task requesting the communication is the highest in the RT tasks being set in a wait state; and making the GP task succeed to the priority of the RT task requesting the communication and being determined to have the highest priority in the RT tasks being set in the wait state;

wherein the making includes specifying a priority succession management list storing task control blocks of the RT tasks set in the wait state by requesting the communication, and a wait target stored in a task control block of the RT task determined to have the highest priority by using the priority succession management list, to specify a communication mechanism used by the RT task using the wait target; and making the priority of the RT task succeed to the process communicating with the RT task.

3. The computer readable recording medium according to claim 2, wherein a communication between the RTOS and the GPOS is the communication using an inter-OS communication mechanism.

4. A task management apparatus for executing a hybrid operating system including a general purpose operating system (GPOS) and a real time operating system (RTOS), the RTOS executing a process under the GPOS as one of real time tasks (RT tasks) to execute the process with a high priority, the task management apparatus executes the GPOS as a general-purpose OS task (GP task), the task management apparatus comprising:

a computer including:
  a central processing unit;
  a random access memory;
  a read only memory;
  a hard disk drive; and
  an input/output interface, wherein, the central processing unit is configured to perform as a transmitting unit that transmits a request for a communication between the RTOS and the GPOS from an RT task having a priority and included in the RT tasks to the GP task;

a setting unit that sets RT tasks in a wait state, when the communication between the RTOS and the GPOS requested;

a determining unit that determines whether a priority of the RT task requesting the communication is the highest in the RT tasks being set in the wait state; and a priority succession unit that makes the GP task succeed to the priority of the RT task requesting the communication and being determined to have the highest priority in the RT tasks being set in the wait state;

a resuming unit that resumes execution of the RT tasks being set in the wait state by the priority succession unit by ending the communication, wherein the determining unit further determines whether an other RT task having the highest priority is present in the RT tasks being set in the wait state, by requesting a communication between the RTOS and the GPOS, by using a priority succession management list in which task control blocks of tasks of all RT tasks being set in the wait state are connected in order of priority, and the priority succession unit further makes the other RT task succeed to priority of the RT task having the highest-priority, when presence of the other RT task having the highest priority is determined by specifying a head of the priority succession management list.

5. A task management apparatus for executing a hybrid operating system including a general purpose operating system (GPOS) and a real time operating system (RTOS), the RTOS executing a process under the GPOS as one of real time tasks (RT tasks) to execute the process with a high priority, the task management apparatus executes the GPOS as a general-purpose OS task (GP task), the task management apparatus comprising:

a computer including:

a central processing unit;
a random access memory;
a read only memory;
a hard disk drive; and
an input/output interface, wherein, the central processing unit is configured to perform as a transmitting unit that transmits a request for a communication between the RTOS and the GPOS from an RT task having a priority and included in the RT tasks to the GP task;

a setting unit that sets RT tasks in a wait state, when the communication is between the RTOS and the GPOS;

a determining unit that determines whether the priority of the RT task requesting the communication is the highest in the RT tasks being set in the wait state; and a priority succession unit that makes the GP task succeed to the priority of the RT task requesting the communication and being determined to have the highest priority in the RT tasks being set in the wait state;

wherein the priority succession unit specifies a communication mechanism used by the RT task, the communication mechanism performs a communication between the RTOS and the GPOS, and a priority succession management list storing a task control block of the RT tasks set in the wait state by requesting the communication, and the priority succession unit further makes the priority of the RT task succeed to the process communicating with the RT task.

* * * * *